(12) United States Patent
Talbert (10) Patent No.: US 9,736,528 B2
(45) Date of Patent: Aug. 15, 2017

(54) CONTENT DELIVERY FOR VIEWING DEVICES WITHIN A CUSTOMER PREMISES

(75) Inventor: Michael Talbert, Nazareth, PA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 581 days.

(21) Appl. No.: 13/230,039

(22) Filed: Sep. 12, 2011

(65) Prior Publication Data

US 2013/0067509 A1 Mar. 14, 2013

(51) Int. Cl.

| H04N 7/173 | (2011.01) |
| H04N 21/436 | (2011.01) |
| H04N 21/4363 | (2011.01) |
| H04N 21/4402 | (2011.01) |
| H04N 21/442 | (2011.01) |
| H04N 21/845 | (2011.01) |
| H04N 21/61 | (2011.01) |

(52) U.S. Cl.
CPC ... *H04N 21/43615* (2013.01); *H04N 21/4363* (2013.01); *H04N 21/43632* (2013.01); *H04N 21/43637* (2013.01); *H04N 21/440218* (2013.01); *H04N 21/44222* (2013.01); *H04N 21/6118* (2013.01); *H04N 21/8456* (2013.01)

(58) Field of Classification Search
CPC ......... H04N 21/44222; H04N 21/8456; H04N 21/6118; H04N 21/43615; H04N 21/4363; H04N 21/43632; H04N 21/43637

USPC .......... 725/133, 141, 153, 80, 131
See application file for complete search history.

(56) References Cited

U.S. PATENT DOCUMENTS

| 2003/0156218 A1* | 8/2003 | Laksono ............ 348/388.1 |
| 2008/0271107 A1* | 10/2008 | Shioyama et al. ........ 725/131 |
| 2008/0313691 A1* | 12/2008 | Cholas et al. ........... 725/131 |
| 2008/0320543 A1* | 12/2008 | Wang et al. ............ 725/131 |
| 2010/0169940 A1* | 7/2010 | Howarter et al. ......... 725/80 |
| 2012/0077463 A1* | 3/2012 | Robbins et al. .......... 455/411 |

OTHER PUBLICATIONS

QuickTime and Beyond. http://web.archive.org/web/20100705112757/http://www.apple.com/quicktime/extending/resources.html. Jul. 5, 2010.*

* cited by examiner

*Primary Examiner* — Farzana Hossain (57) ABSTRACT

A streaming device may broadcast multimedia content, such as television signals, to electronic devices in a customer premises. The device may include a tuner to receive a signal, corresponding to a number of television channels, and to extract a second signal corresponding to a selected channel. The device may include a media processor to transcode the extracted signal to a second encoded format. The device may further authenticate a destination device as a destination device that is authorized to receive at least some of the television channels, and receive, from the destination device, channel selection information that identifies the selected channel. The device may further include a communication interface to transmit the signal, in the second encoded format, to the destination device.

20 Claims, 8 Drawing Sheets

CONTENT DELIVERY FOR VIEWING DEVICES WITHIN A CUSTOMER PREMISES

BACKGROUND

Television service providers may provide video streams that are delivered to a customer premises over a number of possible transmission mediums, such as fiber optic delivery, coaxial delivery, or over-the-air delivery. At the customer premises, a client device may convert the television signal into a form that is displayable on a television set. The client device may be, for example, a set-top box (STB) through which the user may control the channel that is being viewed.

In addition to traditional television sets, subscribers may possess a number of portable electronic devices, such as mobile phones, laptops, tablet computing devices, or other electronic devices. Connecting such a portable electronic device to the output of a STB, to view television programming, may not be supported by the interfaces of the electronic device and/or the STB.

DETAILED DESCRIPTION OF PREFERRED EMBODIMENTS

The following detailed description refers to the accompanying drawings. The same reference numbers in different drawings may identify the same or similar elements.

Techniques described herein may relate to a streaming device that may broadcast multimedia content, such as television signals, to electronic devices in a customer premises. The electronic devices may include traditional television sets as well as other types of electronic devices, such as tablet computing devices or mobile telephones. In one implementation, the streaming device may include a cable card interface to receive television signals, such as over a coaxial connection. The streaming device may decrypt the input television signals, convert the television signals to an audio/visual stream, such as a HD (high definition) MPEG (moving picture expert group) stream, and output the stream to a requesting electronic device. The output stream may include, for example, a HLS (HTTP Live Streaming) stream and may be available within a local network of a customer's premises.

The streaming device may provide a cost effective solution for a television provider to provide additional viewing choices for a customer premises, without requiring the television provider to update the STBs in the customer premises.

In some implementations, the output of the streaming device may be input to an existing STB. For instance, the streaming device may receive, from a television provider, MPEG-4 formatted video. The streaming device may convert the MPEG-4 formatted video to a video format compatible with the STB, such as a MPEG-2 video stream, and may output the converted video stream to the STB. In this manner, the streaming device may provide a cost effective solution for a television provider to use an updated video format (e.g., MPEG-4) to deliver video to a customer premises without requiring the television provider to update the STBs in the customer premises.

Figure 1:
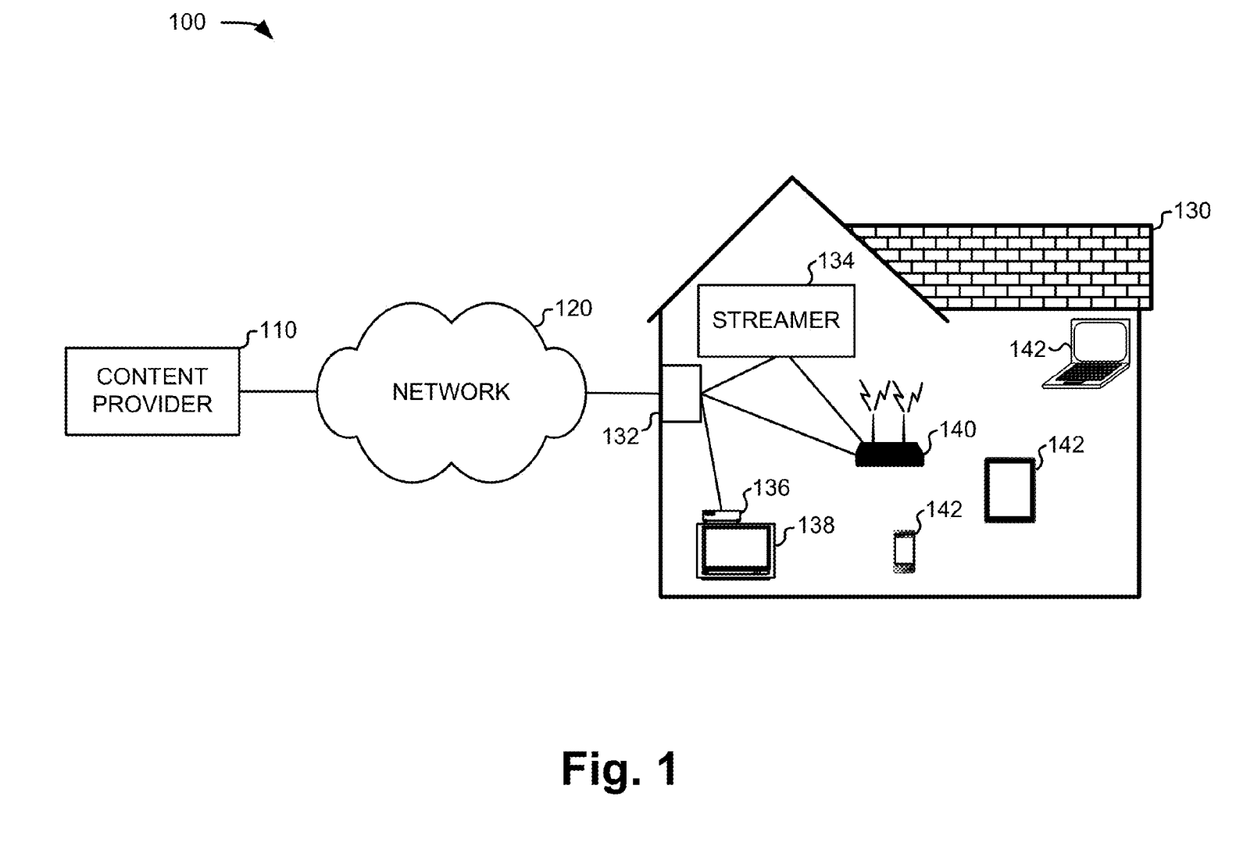
FIG. 1 is a diagram of an example environment in which systems and/or methods described herein may be implemented.

FIG. 1 is a diagram of an example environment 100 in which systems and/or methods described herein may be implemented. As illustrated, environment 100 may include a content provider 110, a network 120, and a customer premises 130. Although a single content provider 110, network 120, and customer premises 130 are illustrated in FIG. 1 for simplicity, in practice, there may be additional content providers 110, networks 120, and/or customer premises 130.

Content provider 110 may include one or more server devices that provide content, such as television content, to customer premises 130. For example, content provider 110 may include a television provider, such as a telecommunications company that provides broadcast television channels, non-broadcast television channels, pay-per view content, or other television content to customer premises 130. In addition to providing content, content provider 110 may include devices that perform other functions, such as registration servers, security servers, provisioning servers, or other devices that may relate to managing customers and/or providing encryption/security functions for content delivered to customer premises 130. In one implementation, content provider 110 may also provide electronic program guide (EPG) or interactive program guide (IPG) information to customer premises 130.

Network 120 may include a network to deliver information, such as signals for television stations, over fiber optic cables, coaxial cables, radio frequency wireless links, satellite links, or a network that delivers information over another form of wired or wireless connection. In one possible implementation, network 120 may include an over-the-air broadcast network or a hybrid network, such as a hybrid fiber-coaxial network.

Customer premises 130 may include one or more devices that are connected to each other. Customer premises may obtain telecommunication services from network 120. Devices in customer premises 130 may include, for example, STBs, televisions, computing devices, and home networking equipment (e.g., routers, modems, cables, splitters, local gateways, etc.). Devices within customer premises 110 may be connected via wired (e.g., coaxial cable, Telecommunications Industry Association category 5 ("cat 5") cable, etc.) or wireless connections (e.g., using network devices such as those available under the IEEE 802.11 wireless LAN standards).

In the example shown in FIG. 1, customer premises 130 may include a number of devices connected to form a local network associated with customer premises 130. As shown, customer premises 130 may include a termination unit 132, a streamer component 134 ("STREAMER"), a STB 136, a television 138, a local router 140, and user devices 142.

Termination unit 132 may include a device to connect with network 120 and convert signals from network 120 into a format useable within customer premises 130. For example, in the situation in which customer premises 130 is connected to network 120 via a fiber optic connection, termination unit 132 may receive the fiber optic connection and convert the optical signals into an output format that is transmitted over coaxial cables. Alternatively, or additionally, termination unit 132 may include a satellite interface, such as a satellite dish and related logic, to receive television signals over a satellite broadcast and convert the received signals into an output format that is transmitted over coaxial cables. In both of these examples, signals within customer premises 130 may conform to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Alternatively, or additionally, in the situation in which customer premises 130 is connected to network 120 via a coaxial cable connection, termination unit 132 may include a cable modem.

Streamer component 134 may receive content, such as television signals, and may provide the television signals to other devices in customer premises 130, such as user devices 142. Streamer component 134 may include a cable card interface to decrypt and process the television signals. Streamer component 134 may output the television signals as, for example, an Internet Protocol (IP) packet stream, such as a HLS stream that can be wirelessly rebroadcast by wireless router 140 to user devices 142. Streamer component 134 will be described in more detail below.

STB 136 may include a device that receives and/or processes video content, such as television broadcasts, and provides the video content to television 138 or another device. STB 136 may also include decoding and/or decryption capabilities and may further include a digital video recorder (DVR) (e.g., a hard drive). In one example implementation, STB 136 may be incorporated directly within television 138. Alternatively, or additionally, STB 136 may conform to MoCA standards.

Television 138 may include a device that is capable of displaying video content, television programming, content provided by STB 136, and/or content provided by other devices (e.g., a digital video disk (DVD) player, a video camera, etc., not shown) connected to television 138.

Local router 140 may include a device that may provide connectivity for equipment within customer premises 130 (e.g., user devices 142). In one implementation, local router 140 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used. Local router 140 may also include one or more wired (e.g., Ethernet) connections.

Each of user devices 142 may include any device that is capable of communicating via local router 140. For example, each of user devices 142 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a personal access device ("pad" device), a smart phone, a global positioning system (GPS) device, a content recording device (e.g., a camera, a video camera, etc.), etc. As illustrated in FIG. 1, user devices 142 may include a mobile phone, a tablet computing device, and a laptop computer.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100. For example, although various components are illustrated in customer premises 130 as being connected using Ethernet and WiFi connections, the components could be connected using other technologies, such as MoCA, powerline networking (e.g., data signals transmitted over power lines), or HPNA (home phoneline networking alliance) based technologies.

Figure 2:
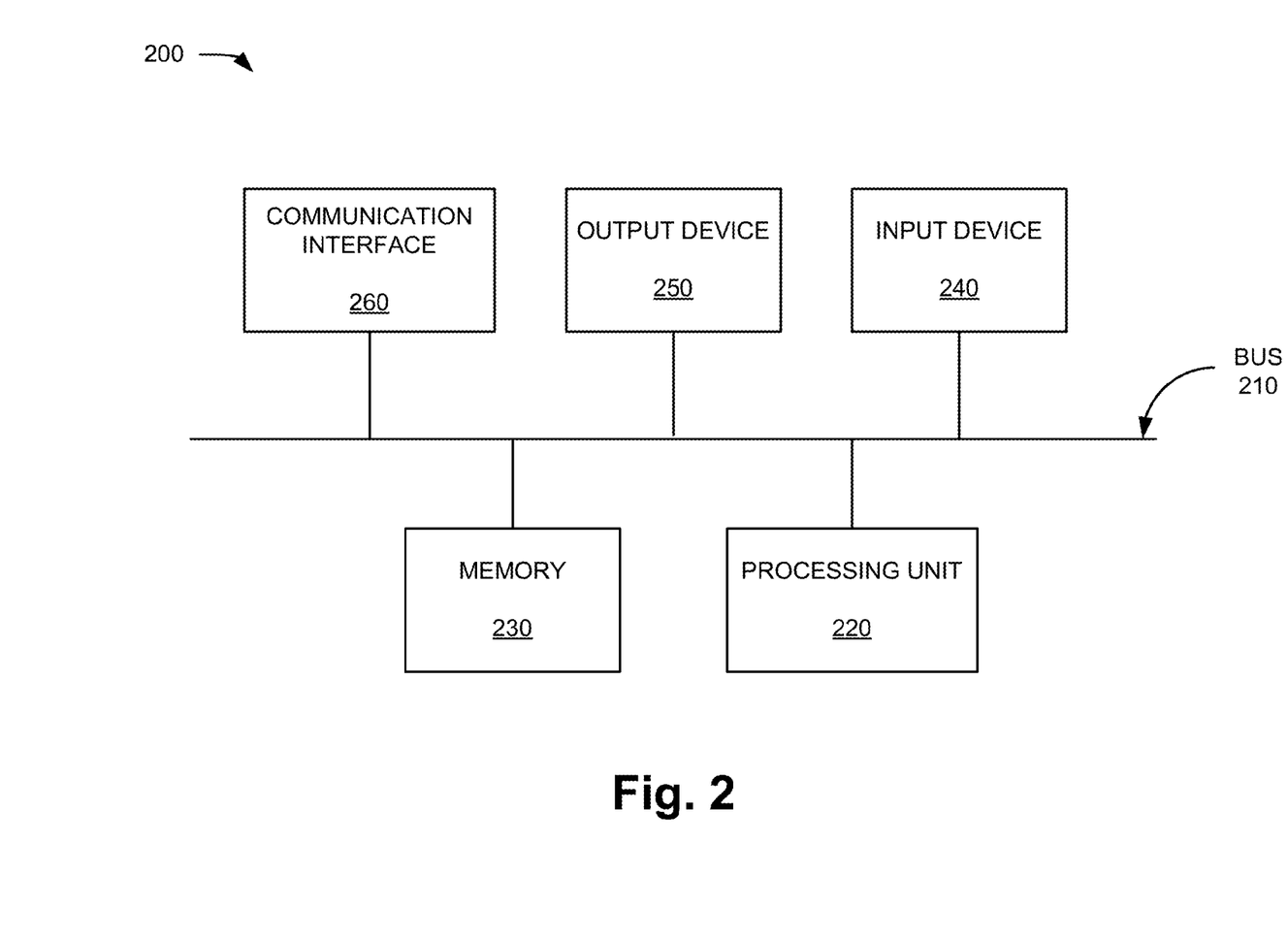
FIG. 2 is a diagram of example components of a device that may be used in the environment shown in FIG. 1.

FIG. 2 is a diagram of example components of a device 200 that may correspond to one of the components in environment 100, such as streamer component 134, STB 136, local router 140, user device 142, and/or a server at content provider 110. In one example implementation, one or more components in environment 100 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein.

Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
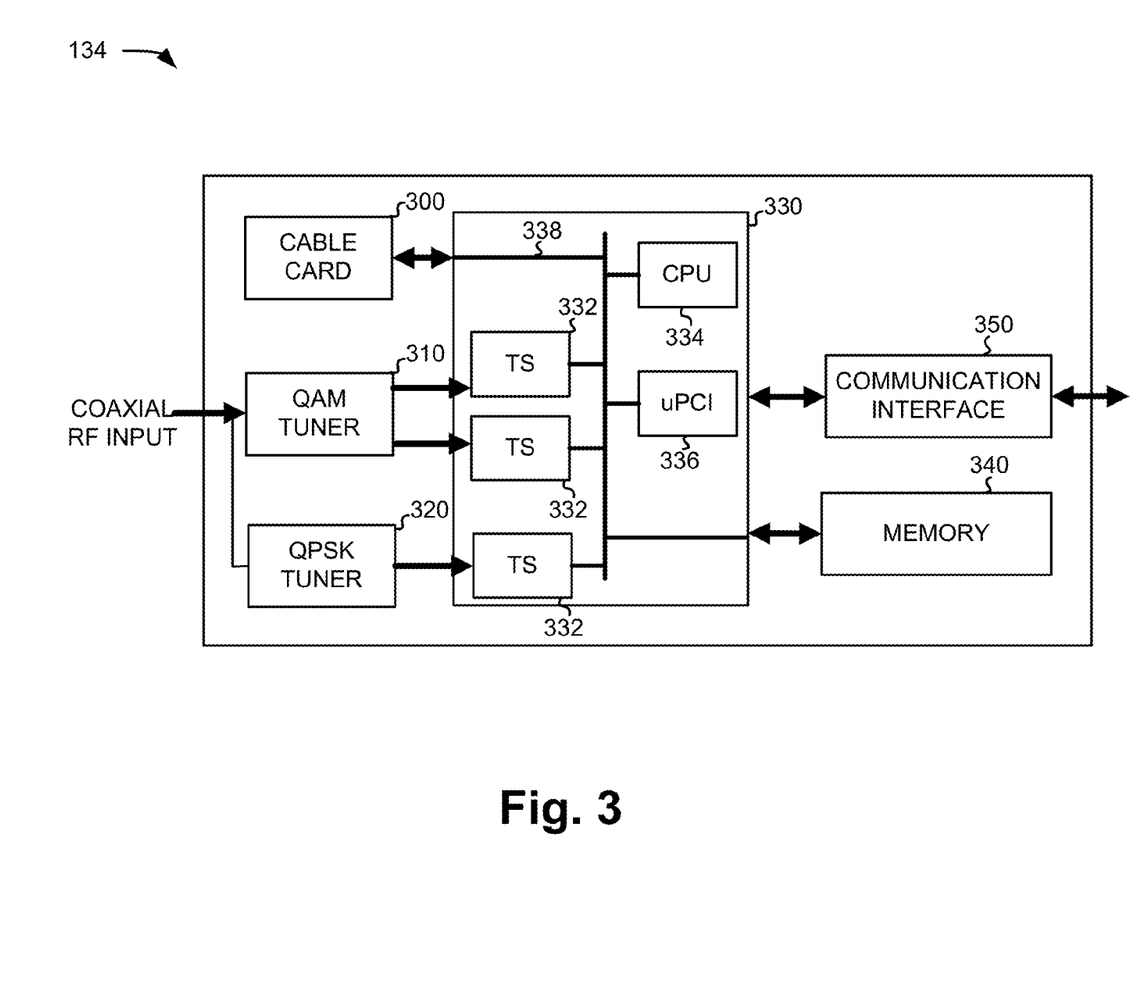
FIG. 3 is a diagram illustrating an example of functional components of an implementation of a streamer component shown in FIG. 1.

FIG. 3 is a diagram illustrating an example of functional components of an implementation of streamer component 134. Streamer component 134 may include a cable card 300, a quadrature amplitude modulation (QAM) tuner 310, a quadrature phase-shift keying (QPSK) tuner 320, a media processor 330, a memory 340, and a communication interface 350. Cable card 300, QAM tuner 310, and/or QPSK tuner 320 may represent a first (content provider side) interface of streamer component 134 and communication interface 350 may represent a second (local network side) interface of streamer component 134.

Cable card 300 may include a device that handles decryption of video from content provider 110. In general, cable card 300 may operate to ensure that only television channels that are authorized for customer premises 130 can be seen at customer premises 130. In one implementation, cable card 300 may be a card that is physically insertable/removable from streamer component 134, such as a card conforming to the PCMCIA type II card interface. Alternatively, or additionally, cable card 300 may be integrated into streamer component 134 as a fixed component. Cable card 300 may be capable of decoding one or more channels at a time. For instance, in one implementation, cable card 300 may be a multi-stream device that can simultaneously decode multiple channels.

In other possible implementations, components other than cable card 300 may be used to handle decryption of protected content. For example, a smartcard, conditional access system (CAS), or other component may be used to decrypt content from source.

QAM tuner 310 may include logic to demodulate television signals that are received (e.g., over a coaxial cable) as QAM modulated signals. In general, QAM modulation may be performed by changing the amplitude of two carrier waves using an amplitude-shift keying digital modulation scheme or an amplitude modulation analog modulation scheme. In some implementations, QAM tuner 310 may include multiple QAM tuners (e.g., two or four QAM tuners) to simultaneously support multiple video streams. In FIG. 3, two output signals are illustrated as being produced by QAM tuner 310, which may correspond to a dual version of QAM tuner 310.

QPSK tuner 320 may include logic to demodulate signals that are received as QPSK modulated signals. In general, QPSK modulation may be performed by modulating the phase of a reference signal. QPSK tuner 320 may be used to receive command and control signaling from content provider 110.

In other possible implementations, the television signals may be received in a format other than as QAM/QPSK modulated signals. For example, streamer component 134 may receive the television signals as an IP signal, such as a video on demand or multicast IP signal (e.g., IPTV). In another possible implementation, streamer component 134 may connect directly or indirectly to a satellite based television delivery system, and may include logic to receive signals from the satellite based television delivery system.

Media processor 330 may perform media transcoding and streaming functions. Media processor 330 may, for example, receive input video streams (e.g., television streams) from QAM tuner 310 and/or cable card 300, convert the video streams into a desired output format, and stream the converted version of the video streams through communication interface 350. In one implementation, media processor 330 may receive HD MPEG-2 or HD MPEG-4 input video streams and convert the video streams to a HLS stream. In another possible implementation, media processor 330 may receive HD MPEG-4 input video streams and convert the video streams to HD MPEG-2 video streams, which may be output to legacy STBs 136 that are not MPEG-4 compatible. In one example implementation, media processor 330 may be Zenverge ZN200 processor, available from Zenverge Corporation.

As shown in FIG. 3, media processor 330 may include a number of transport stream (TS) processors 332, a processor (CPU) 334, a micro-Peripheral Component Interface (microPCI) 336, and a bus 338.

TS processors 332 may operate to perform transcoding and translating functions on incoming video streams. Thus, TS processors 332 may convert input video streams into a format needed by the devices at which the video is to be displayed (e.g., television 138 or user devices 142). For example, a TS processor 332 may convert a MPEG-4 stream to a MPEG-2 stream.

Processor 334 may perform general control and processing functions for media processor 330. For example, for HLS streaming, processor 334 may be used to support HLS chunking (i.e., segmenting a video stream into segments) and channel changes. MicroPCI 336 may provide a PCI interface for components external to media processor 330, such as communication interface 350. Alternatively, or additionally, other interface and/or bus technologies may instead be used. Bus 338 may provide a communication path between elements of media processor 330.

Memory 340 may include a dynamic or static storage device that stores information and/or instructions. In one implementation, instructions, for execution by processor 334, may be stored in memory 340 and read by processor 334 when needed.

Communication interface 350 may include an interface, or interfaces, through which streamer component 134 connects to external devices, such as STB 136, television 138, local router 140, and/or user devices 142. In one implementation, communication interface 350 may include a wired Ethernet interface. With this implementation, streamer component 134 may be directly connected to another device, such as STB 136 or local router 140. By connecting streamer component 134 to local router 140, media streams output from streamer component 134 may be wirelessly forwarded to destination user devices 142. Alternatively, or additionally, communication interface 350 may include a wireless transceiver to wirelessly connect to local router 140 and/or user devices 142. Alternatively, or additionally, communication interface 350 may include a coaxial cable connection for connecting to, for example, STB 136.

Although FIG. 3 shows example components of streamer component 134, in other implementations, streamer component 134 may contain fewer components, different components, differently arranged components, or additional components than depicted in FIG. 3. Alternatively, or additionally, one or more components of streamer component 134 may perform one or more tasks described as being performed by one or more other components of streamer component 134. For example, the functionality of QAM tuner 310 and/or QPSK tuner 320 may be included within cable card 300.

Figure 4:
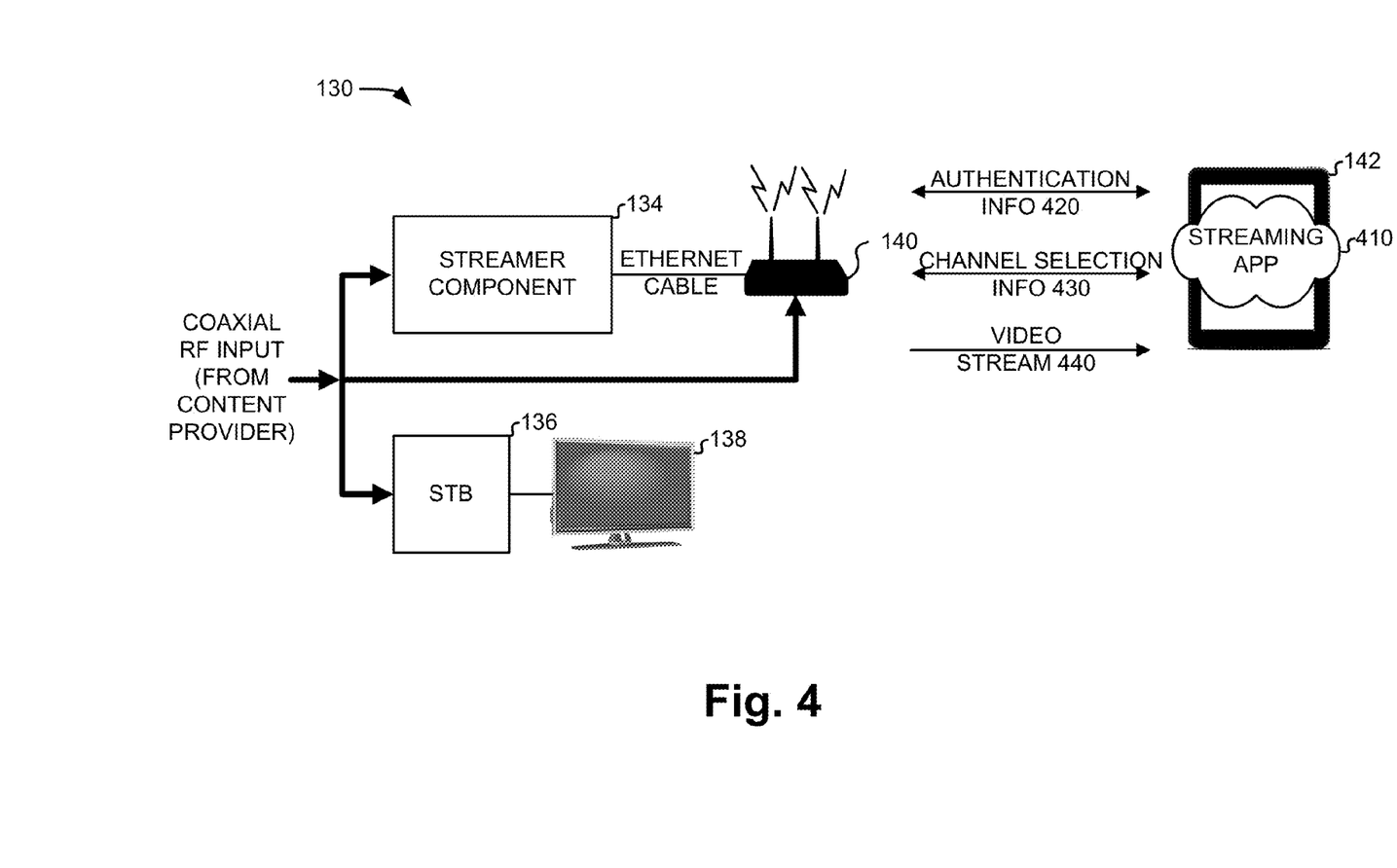
FIG. 4 is a diagram illustrating an example system using a streaming component.

FIG. 4 is a diagram illustrating an example system, using streaming component 134, at a customer premises 130. As shown, streamer component 134, STB 136, and local router 140 may include a coaxial RF interface for communicating with content provider 110. Streamer component 134 and STB 136 may extract video streams, such as television channels, from the coaxial RF signals. STB 136 may provide the extracted television signal to television 138. Local router 140 may use the coaxial RF signals to provide broadband (e.g., packet data) content to user devices 142.

Streamer component 134 may provide television content, such as television content that would normally be provided by STB 136 to television 138, to user device 142. User device 142 may particularly be a personal access device (PAD), such as a tablet computer, a mobile phone, etc., that is within customer premises 130. The provided television content may be the content that is subscribed-to by the account associated with customer premises 130.

In one implementation, the television content provided from streamer component 134 to user device 142 may be a packet-based stream, such as a HLS stream. HLS is a known HTTP-based media streaming protocol that generally operates by breaking an overall stream into a sequence of small HTTP-based file downloads, where each download may include one chunk of an overall potentially unbounded transport stream. Because HLS uses only standard HTTP transactions, HLS may be particularly useful for traversing firewalls or proxy servers that let through standard HTTP traffic. In alternative implementations, other media streaming protocols or technologies may alternatively be used.

User device 142 may include logic, illustrated as streaming application (APP) 410, to control and present the streamed television channels to the user of user device 142. Streaming application 410 may include, for example, software installed by the user on user device 142 or software included during manufacturer or provisioning of user device 142. Through streaming application 410, a user may, for example, select a television channel to view, purchase pay-per-view content, view program guide information, or perform other functions that may normally be performed by a user viewing television content via STB 136.

A number of types of communications may be performed, using local router 140, between streamer component 134 and user device 142. Three example types of communications are shown in FIG. 4: authentication information (INFO) 420, channel selection information 430, and video stream 440. Authentication information 420 may represent messages transmitted between user device 142, streaming component 134, and/or content provider 110 that relate to the authentication of user device 142, the authorization of content for viewing at user device 142, or the provisioning of user device 142. Channel selection information 430 may include information describing the viewing preferences of the user of user device 142. For example, channel selection information 430 may include the channel currently selected by the user, program guide information that is to be displayed by user device 142, or other information relating to the control of content that is presented to the user. Video stream 440 may include the substantive content, such as a particular television channel, that is selected by the user. As previously mentioned, video stream 440 may be transmitted as a HLS stream. Alternatively, other standards or protocols may be used, such as Real-time Transport Protocol (RTP) over User Datagram Protocol (UDP).

Alternatively, or additionally, streamer component 134 may be configured or connected differently than shown in FIG. 4. For example, streamer component 134 may include a wireless transceiver, such as a WiFi transceiver, and may thus connect to local router 140 wirelessly. As another example, streamer component 134 may connect directly to user device 142, such as through a wireless connection or wired connection (e.g., Ethernet connection, universal serial bus (USB) connection, etc.). In alternative implementations, other connection/networking technologies, such as MoCA, Powerline networking, or HPNA, may additionally be used to connect streamer component to the content provider and/or to user devices 142.

Figure 5:
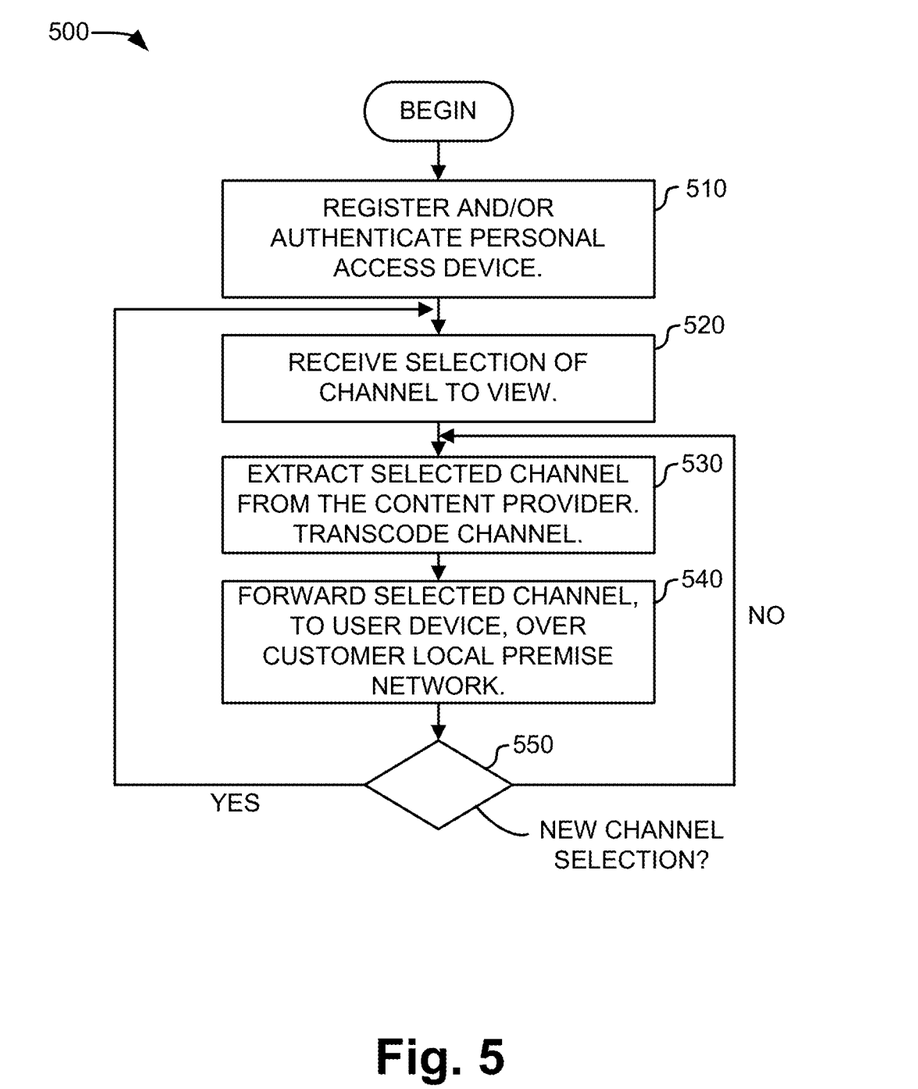
FIG. 5 is a flow chart illustrating an example process for streaming content to a device.

FIG. 5 is a flow chart illustrating an example process 500 for streaming content to a user device. Process 500 may be performed in the context of the system shown in FIG. 4.

Process 500 may include registering and/or authenticating a personal access device (e.g., a user device 142) at which streaming application 410 is installed (block 510). Registering the personal access device may include, for example, associating the personal access device with customer premises 130 associated with the user of the personal access device. Registration may be an event that is performed only when streaming application 410 is initially installed or executed on the personal access device.

In general, authenticating the personal access device may include determining whether the personal access device is authorized to receive television channels from content provider 110. Authenticating the personal access device may include determining whether the personal access device is communicating with local router 140 that is associated with the account corresponding to the customer premises 130. In one implementation, streaming application 410 may include a device discovery mechanism to automatically locate a streamer component 134 that is within range of streaming application 410. The device discovery mechanism may, for example, contact content provider 110 to determine if any authorized streamer components 134 are active on the public IP address associated with streaming application 410. Alternatively, or additionally, authentication may also include an entitlement determination in which, for example, streaming application 410 may contact content provider 110 to determine the subscribed channels for the account associated with customer premises 130.

Process 500 may further include receiving selection of a channel to view (block 520). For example, through a graphical interface presented by streaming application 410, the user may enter a television channel number, select a television channel or program from an on-screen program guide, or in some other way indicate content in which the user is interested. The selection of the channel may be transmitted to streamer component 134 (e.g., through channel selection information 430).

Process 500 may further include extracting the selected channel from the content provider (block 530). For example, streamer component 134 may extract, using QAM tuner 310 and cable card 300, the selected channel from the RF coaxial input. In situations in which the extracted signal needs to be converted to a format compatible with playback at user device 142, streamer component 134 may additionally transcode the extracted signal to the desired format (block 530). For example, a television channel may be received as a MPEG-4 encoded transport stream. Streamer component 134 may transcode the MPEG-4 stream into a MPEG-2 transport stream for streaming using HLS.

Process 500 may further include forwarding the selected (and potentially transcoded) channel over the customer's local premises network (block 540). For example, the selected channel may be wirelessly streamed, as a HLS stream and by local router 140, to user device 142. User device 142 may include, for example, a personal access device, such as a tablet computer. At user device 142, the channel may be decoded and presented to the user.

At some point, the user may select a new channel for viewing. In response to the new channel selection, (block 550—YES), the channel selection information may be transmitted to streamer component 134 (block 520), and the newly selected channel may be streamed to user device 142 (blocks 530 and 540) for playback.

Figure 6:
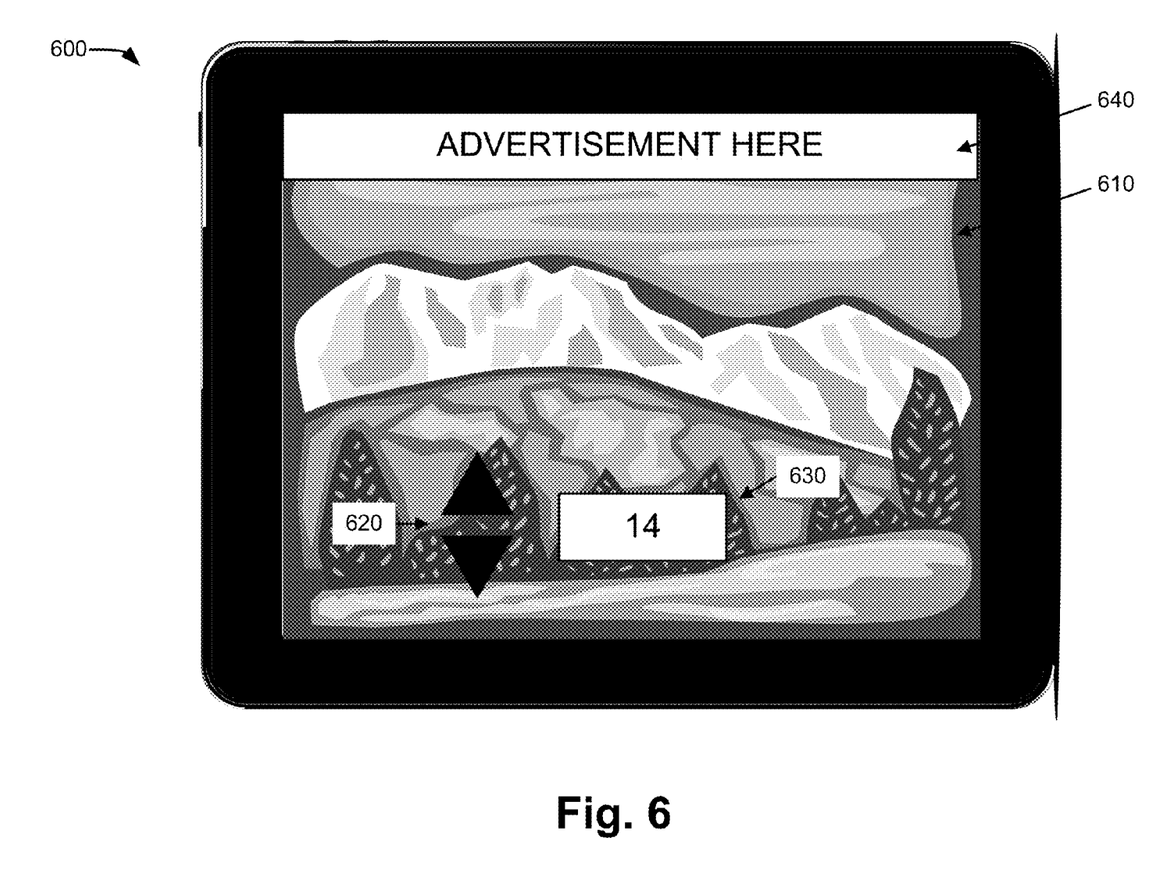
FIG. 6 is diagram illustrating an example of a graphical interface that may be presented by a streaming application.

FIG. 6 is diagram illustrating an example of a graphical user interface 600 that may be presented, by streaming application 410, on user device 142. As shown, user interface 600 may include a main display section 610, in which the selected channel may be shown. In one implementation, display section 610 may include all or substantially all of the display area of user device 142. In this implementation, user interface elements may be overlayed on main section 610 in response to, for example, user touch interaction with the display. As shown in FIG. 6, up and down channel selection arrows 620 and a channel selection box 630 may be displayed in response to a user touch of main display section 610. Through channel selection arrows 620, the user may increment or decrement the currently selected channel. Through channel selection box 630, the user may enter the number of the channel that is desired, such as by typing the number on a virtual keypad.

An advertisement section 640 may additionally be overlayed on main display section 610. Advertisement section 640 may present, for example, a textual or video advertisement. In one implementation, advertisement section 640 may only be displayed when the user is interacting with main display section. The advertisements for display in advertisement section may be transmitted as part of the channel HLS stream. Alternatively, the advertisement content may be received by streaming application 410 directly from content provider 110 and without traversing streamer component 134 (i.e., as broadband content received from a local router 140).

Because the location of customer premises 130 is known, as well as potentially other information relating to the user associated with customer premises 130, advertisements provided in advertisement section 640 may be geographically or otherwise targeted to the particular user.

In one implementation, the graphical interface associated with graphical user interface 600 may be a custom interface that can be dynamically generated based on information received from content provider 110, such as information received during initial registration of streaming application 410. For example, graphical user interface 600 may be branded with a particular provider logo, color scheme, or other visual customization.

Although FIG. 6 shows example graphical elements of graphical user interface 600, in other implementations, graphical user interface 600 may contain fewer graphic elements, different graphic elements, differently arranged graphic elements, or additional graphic elements than depicted in FIG. 6.

Figure 7:
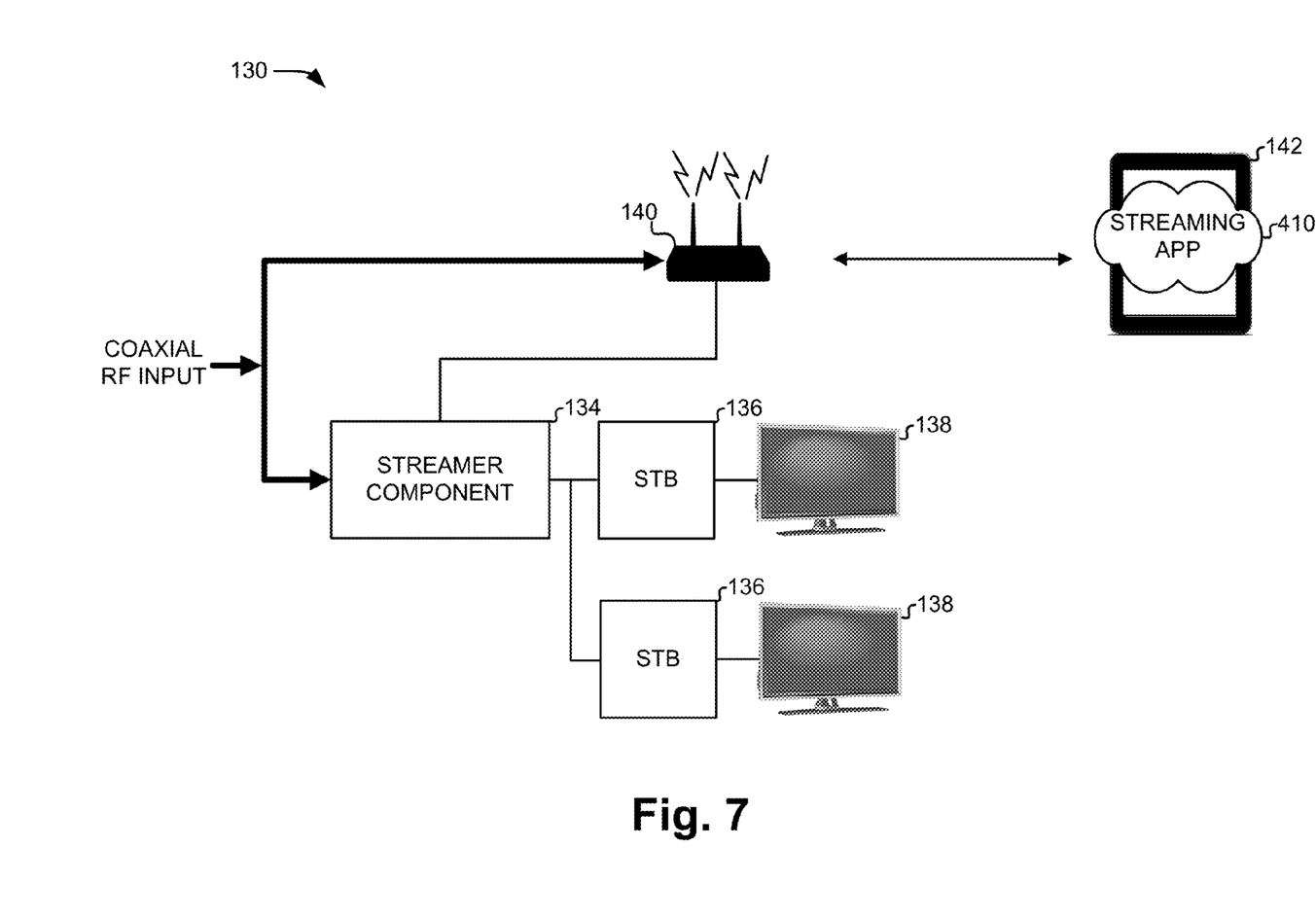
FIG. 7 is a diagram illustrating a second example system using a streaming component.

FIG. 7 is a diagram illustrating an example system, using streamer component 134, according to a second implementation, at customer premises 130. As shown, streamer component 134 and local router 140 may include a coaxial RF interface for communicating with content provider 110 (not shown). In contrast to the system shown in FIG. 4, however, as shown in FIG. 7, STB 136 may not be connected directly to the coaxial connection. Instead, one or more STBs 136 (two are illustrated in FIG. 7) may receive television signals from the output of streamer component 134. This may be useful in situations in which the encoding scheme used by content provider 110 is not compatible with the encoding scheme required by STBs 136. For example, assume content provider 110 would like to upgrade network 120 to use a MPEG-4 encoded transport stream. However, legacy STBs 136 that are installed at customer premises 130 may not be capable of supporting MPEG-4 streams. In this case, instead of replacing one or more, potentially expensive STBs 136, at each customer premises 130, a single streamer component 134 may be installed. The legacy STBs 136 may not need to be upgraded or may only need to be upgraded to be able to transmit channel selection information to streamer component 134, which may be potentially accomplished through a software upgrade.

In operation, streamer component 134 may receive a RF coaxial input, from content provider 110, and may transcode the input signals into a format compatible with STBs 136 and into a format compatible for streaming to user device 142. For instance, streamer component 134 may include multiple QAM tuners 310 and TS processors 332. A first QAM tuner 310 and TS processor 332 may extract a television channel requested by streaming application 410 and transcode the extracted television signal into a format that may be streamed to user device 142 (e.g., a HLS stream). A second set of QAM tuners 310 and TS processors 332 may extract television channels requested by STBs 136 and transcode the extracted signal into a format that may be input to STBs 136 (e.g., a MPEG-2 stream transmitted over a coaxial cable or an Ethernet cable to STBs 136).

In alternative implementations, streamer component 134 may be configured or connected differently than shown in FIG. 7. For example, streamer component 134 may include a wireless transceiver, such as a WiFi transceiver, and may thus connect to local router 140 wirelessly. As another example, streamer component 134 may connect directly to user device 142, such as through a wireless connection or wired connection (e.g., Ethernet connection, universal serial bus (USB) connection, etc.). As another example, streamer component 134 may connect wirelessly to STBs 136.

Figure 8:
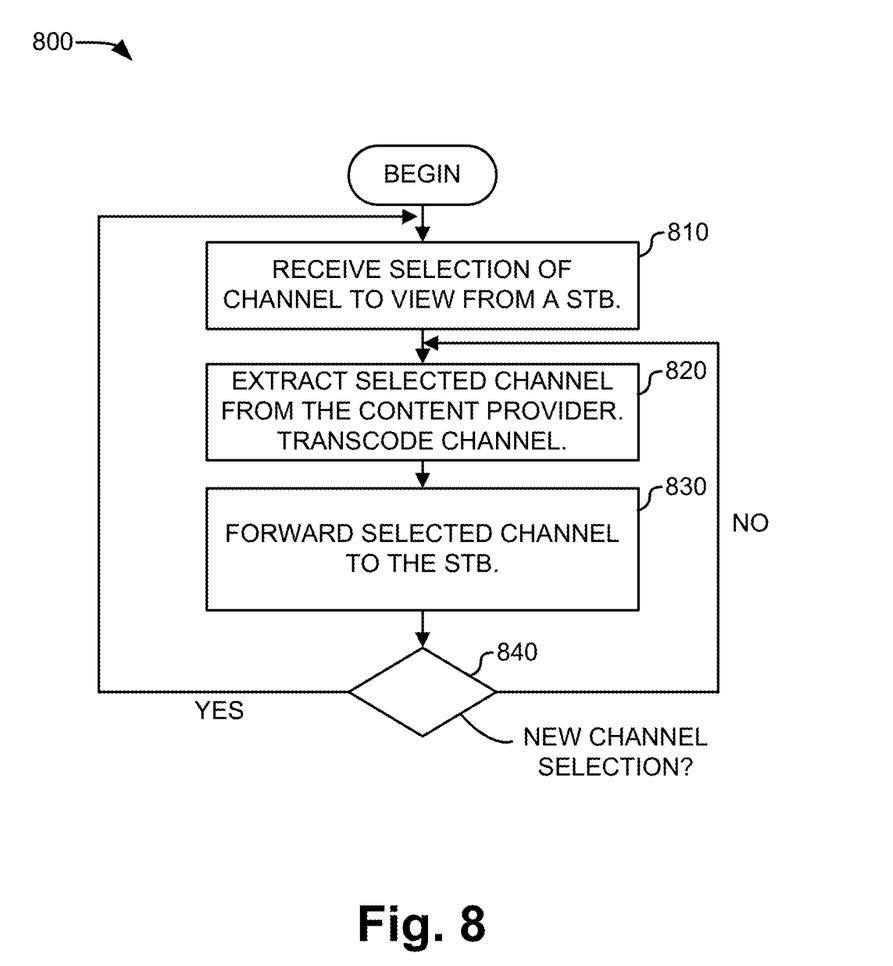
FIG. 8 is a flow chart illustrating an example process for streaming content to a device.

FIG. 8 is a flow chart illustrating an example process 800 for streaming content to a user device in the context of streamer component 134 augmenting a STB 136, as illustrated in the system shown in FIG. 7.

Process 800 may include receiving, from STB 136, selection of a channel to view (block 810). For example, a user may select, through a channel guide presented by STB 136, a channel in which the user is interested. STB 136 may transmit that selection of the channel to streamer component 134. As another example, if STB 136 is a digital video recorder (DVR), the DVR may transmit a channel selection when a channel is scheduled to be recorded.

Process 800 may further include extracting the selected channel from the content provider (block 820). For example, streamer component 134 may extract, using QAM tuner 310 and cable card 300, the selected channel from the RF coaxial input. Streamer component 134 may additionally transcode the extracted signal to the format required by STB 136 (block 820). For example, a television channel may be received as a MPEG-4 encoded transport stream. Streamer component 134 may transcode the MPEG-4 stream into a MPEG-2 transport stream.

Process 800 may further include forwarding the selected (and potentially transcoded) channel to the STB (block 830). For example, the selected channel may be transmitted as an RF signal over a coaxial cable or through a wired Ethernet interface. At STB 136, the channel may be decoded and presented to the user.

At some point, STB 136 may transmit information regarding a new channel for viewing. In response to the new channel selection, (block 840—YES), the channel selection information may be transmitted to streamer component 134 (block 810), and the newly selected channel streamed to STB 136 (blocks 820 and 830) for playback. In some implementations, multiple channels may be simultaneously forwarded to STB 136. A STB that includes DVR functionality may, for example, display one channel on television 138 while recording another channel.

As described, a cost effective streaming device may enhance viewing options of television stations for a customer premises. In one implementation, the streaming device may extend the functionality of a traditional STB to allow portable computing devices, such as tablet computers, to be used to view television streams. Alternatively, or additionally, the streaming device may augment the functionality of a traditional STB, such as by enabling the STB to present content that is distributed to the customer premises in a format that is not compatible with the STB.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software (e.g., a processor executing instructions).

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a tuner to:
receive a signal corresponding to a plurality of television channels, and
extract a second signal corresponding to a selected channel, in a first encoded format, from the plurality of television channels;
a media processor to transcode the extracted second signal, in the first encoded format, to a second encoded format;
a processor to:
authenticate a portable destination device, that connects to the device, as a portable destination device that is authorized to receive at least some of the plurality of television channels, the authentication including authenticating the portable destination device based on a determination that the portable destination device is within a customer premises of a subscriber to the plurality of television channels, the determination that the portable destination device is within the customer premises of the subscriber including determining whether the portable destination device is in communication with a local wireless router that is associated with an account corresponding to the customer premises, and
receive, from the portable destination device, channel selection information that identifies the selected channel; and
a communication interface to:
connect to the local wireless router; and
transmit the second signal, in the second encoded format, to the portable destination device, via the local wireless router.

2. The device of claim 1, where the second signal includes a packetized video stream that is transmitted to the local wireless router.

3. The device of claim 1, where the second signal includes a HLS (Hyper-Text Transfer Protocol Live Streaming) stream.

4. The device of claim 1, where the tuner includes:
a plurality of quadrature amplitude modulation (QAM) tuners to simultaneously extract a plurality of second signals corresponding to a plurality of selected channels.

5. The device of claim 1, further comprising:
a cable card to perform decryption of the second signal.

6. The device of claim 1, where the tuner includes:
a quadrature phase-shift keying (QPSK) tuner to perform command and control signaling with a content provider of the plurality of television channels.

7. The device of claim 1, where the first encoded format includes a MPEG-4 encoded signal and the second encoded format includes a MPEG-2 encoded signal.

8. The device of claim 7, where the device provides the MPEG-2 encoded signal to a set-top box (STB).

9. The device of claim 1, where the received signal conforms to Multimedia over Coax Alliance (MOCA) standards.

10. The device of claim 1, wherein the local wireless router implements an IEEE 802.11-based wireless local area network.

11. A method comprising:
  receiving, by a device, a television signal, including a plurality of television channels, at a first interface of the device;
  extracting, by the device, a selected television channel, of the plurality of television channels, where the selection of the television channel is received from a mobile personal access device that is authenticated based on a determination that the mobile personal access device is within a customer premises of a subscriber to the plurality of television channels, the determination that the mobile personal access device is within the customer premises of the subscriber including determining whether the mobile personal access device is in communication with a local wireless router that is associated with an account corresponding to the customer premises;
  encoding, by the device, the extracted television channel into a format different than a format in which the selected television channel is received by the device; and
  transmitting, by the device and through a second interface of the device, and via the local wireless router, the encoded television channel to the mobile personal access device.

12. The method of claim 11, where transmitting the encoded television channel includes:
  transmitting the encoded television channel as a HLS (Hyper-Text Transfer Protocol Live Streaming) stream.

13. The method of claim 11, where the encoded television channel includes a packetized video stream that is transmitted, through the second interface, to a local wireless router.

14. The method of claim 11, where extracting the selected television channel includes extracting the channel using a quadrature amplitude modulation (QAM) tuner.

15. The method of claim 11, where the extracted television channel includes a MPEG-4 encoded signal and the encoded television channel includes a MPEG-2 encoded signal.

16. The method of claim 11, wherein the local wireless router implements an IEEE 802.11-based wireless local area network.

17. A non-transitory computer-readable medium storing processor-executable instructions for execution by one or more processors, the processor-executable instructions to:
  receive a television signal, including a plurality of television channels, at a first interface of the device;
  extract a selected television channel, of the plurality of television channels, where the selection of the television channel is received from a mobile personal access device that is authenticated based on a determination that the mobile personal access device is within a customer premises of a subscriber to the plurality of television channels, the determination that the mobile personal access device is within the customer premises of the subscriber including determining whether the mobile personal access device is in communication with a local wireless router that is associated with an account corresponding to the customer premises;
  encode the extracted television channel into a format different than a format in which the selected television channel is received by the device; and
  transmit, through a second interface of the device, and via the local wireless router, the encoded television channel to the mobile personal access device.

18. The non-transitory computer-readable medium of claim 17, where the encoded television channel includes a packetized video stream that is transmitted, through the second interface, to a local wireless router.

19. The non-transitory computer-readable medium of claim 17, where extracting the selected television channel includes extracting the channel using a quadrature amplitude modulation (QAM) tuner.

20. The non-transitory computer-readable medium of claim 17, where the extracted television channel includes a MPEG-4 encoded signal and the encoded television channel includes a MPEG-2 encoded signal.

* * * * *